US005925446A

United States Patent [19]

Matsuda et al.

[11] Patent Number: 5,925,446
[45] Date of Patent: *Jul. 20, 1999

[54] ELECTROPHOTOGRAPHIC TRANSFER PAPER AND COLOR IMAGE FORMING METHOD

[75] Inventors: Tsukasa Matsuda; Kunio Sakurai, both of Ebina; Masaru Kato; Harumi Watanabe, both of Tokyo, all of Japan

[73] Assignees: Fuji Xerox Co., Ltd.; New Oji Paper Co., Ltd., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,150

[22] Filed: Dec. 15, 1995

[30] Foreign Application Priority Data

Dec. 20, 1994 [JP] Japan .................................... 6-316229

[51] Int. Cl.$^6$ ................................ B32B 7/02; B32B 5/16

[52] U.S. Cl. .......................... 428/219; 428/211; 428/342; 428/341

[58] Field of Search .............................. 430/47; 428/211, 428/219, 342, 341, 537.5; 162/138, 181.5, 181.4, 181.2

[56] References Cited

U.S. PATENT DOCUMENTS

| | | | |
|---|---|---|---|
| 3,778,841 | 12/1973 | Gundlach et al. | 346/74 ES |
| 3,861,954 | 1/1975 | Funderburk | 117/218 |
| 4,037,017 | 7/1977 | Maslanka | 428/413 |
| 4,778,711 | 10/1988 | Hosomura et al. | 428/211 |
| 5,057,389 | 10/1991 | Nakayama et al. | 430/49 |
| 5,503,849 | 4/1996 | Bilodeau | 428/448 |

FOREIGN PATENT DOCUMENTS

| | | |
|---|---|---|
| 62-198876 | 9/1987 | Japan . |
| 62-198877 | 9/1987 | Japan . |
| 62-206567 | 9/1987 | Japan . |
| 62/198875 | 9/1987 | Japan . |
| 64-57276 | 3/1989 | Japan . |
| 3-294600 | 12/1991 | Japan . |
| 4-268567 | 9/1992 | Japan . |
| 4-291351 | 10/1992 | Japan . |
| 4-337736 | 11/1992 | Japan . |
| 4-349468 | 12/1992 | Japan . |
| 5-19522 | 1/1993 | Japan . |
| 5-53363 | 3/1993 | Japan . |
| 5-127547 | 5/1993 | Japan . |
| 5-216322 | 8/1993 | Japan . |
| 5-341553 | 12/1993 | Japan . |
| 6-19178 | 1/1994 | Japan . |
| 6-186769 | 7/1994 | Japan . |
| A-6-186769 | 7/1994 | Japan . |
| 1384634 | 2/1975 | United Kingdom . |

*Primary Examiner*—Marion McCamish
*Assistant Examiner*—Cheryl Juska
*Attorney, Agent, or Firm*—Oliff & Berridge, PLC

[57] ABSTRACT

Electrophotographic transfer paper having a coating layer provided on at least one surface of base paper and pigments and adhesive agents as main components, wherein resistivity (VR) and surface resistivity (SV) of electrophotographic transfer paper after the humidity has adjusted to 10° C., 30% RH for 12 hours satisfy the expression Log(VR/SR)≦1.5. Using such electrophotographic transfer paper, occurrence of discharge mark and occurrence of density irregularity in a high-density image region are prevented to thereby make it possible to provide electrophotographic transfer paper excellent in fixing characteristic, nonshowthrough, partial deletion and generation of paper dust.

3 Claims, 3 Drawing Sheets

ELECTROPHOTOGRAPHIC TRANSFER PAPER AND COLOR IMAGE FORMING METHOD

BACKGROUND OF THE INVENTION

1. Field of the Invention

The present invention relates to duplex printing transfer paper and an electrophotographic recording method used in indirect dry electrophotographic full-color or monochrome copying machines and printers.

2. Description of the Related Art

Along with the development of color copying machines and printers as well as digitalization of these systems, high definition of an electrophotographic copying machine and printers have been investigated. In particular, digitalization of input/output information has advanced for obtaining a high quality image with a full-color electrophotographic copying machine or printer and brought about great improvements in image input, image processing, development, transfer, fixing, and the like. Developers and photoreceptors have also been improved in conformity with the tendencies of digitalization, high definition, and high color development recording.

First, a color image forming method will be described below.

FIG. 1 is a general structural diagram of a color image forming apparatus, which comprises an automatic document supply unit 1, an image input portion 2, an image output portion 3, and a paper supply portion 4. Copy cycle in the case of a full color mode will be described below. A color document is set on platen glass 5 by the automatic document supply unit 1. The image input portion 2 includes an imaging unit 6, and a wire 7, a drive pulley 9, etc. for driving the unit. In the case of four colors in full, the image input portion 2 reads the color document by B (blue), G (green) and R (red) as primary colors of light and converts the color document into a digital image signal by using a CCD line sensor and a color filter disposed in the imaging unit 6. Then, the image input portion 2 converts this signal into Y (yellow), C (cyan), M (magenta) and K (black) as primary colors of toner and further converts the color gradation toner signal into an on/off two-valued signal by applying various data processing in order to improve reproducibility in color, gradation, definition, etc. Thus, the image input portion 2 outputs the two-valued signal to the image output portion 3.

The image output portion 3 includes a scanner 10, and a photosensitive material drum 11. Further, there are arranged an electrifier 12 for electrifying the photosensitive material drum 11 uniformly, a developer unit 13 for developing an electrostatic latent image to a toner image, a transfer drum 16 for transferring the toner image onto paper, and a cleaner 15 for recovering the residual toner which has not transferred. The photosensitive material drum 11 is driven by an electric motor so as to rotate in the direction of the arrow shown in the drawing.

In a laser output portion 10*a* of the scanner 10, for example, a yellow image signal from the aforementioned image input portion 2 is converted into a light signal so that a latent image corresponding to the document image is formed on the photosensitive material drum 11 through a polygon mirror 10*b*, an f/θ lens 10*c* and a reflection lens 10*d*. If this yellow latent image is transferred onto paper through development, then the residual toner is removed from the photosensitive material drum 11 by the cleaner 15 and then the photosensitive material drum 11 is electrified by the electrifier 12 so that the laser output portion 10*a* outputs a cyan image signal. Thereafter, latent images of magenta and black image signals are formed successively.

The developer unit 13 has a yellow developer 13Y, a cyan developer 13C, a magenta developer 13M, and a black developer 13K. The respective developers are arranged in the periphery of a rotary shaft. When, for example, a yellow toner image is to be formed, development is performed by the yellow developer 13Y in the position shown in the drawing. When, for example, a cyan toner image is to be formed, the development unit is rotated so that the cyan developer 13C is arranged in a position where the cyan developer 13C touches the photosensitive material drum 11. Magenta and black developments are carried out in the same manner as described above.

A dielectric film or a mesh screen is put up in the outer circumference of the transfer drum 16. The transfer drum 16 is connected to an exclusive-use electric motor or the photosensitive material drum 11 by a gear so that the transfer drum 16 is driven to rotate in the direction of the arrow shown in the drawing. A transfer electrifier 17, a separation electrifier 19, a peel claw 20, a destaticizer 21, a cleaner 22, a push roll 23 and an adsorption electrifier 25 are arranged in the periphery of the transfer drum 16. Transfer paper carried from the paper supply portion 4 via paper supply rollers 26 and paper supply guides 27 is held on the dielectric film or mesh screen by corona of the adsorption electrifier 25. The transfer drum 16 rotates in synchronism with the photosensitive material drum 11, so that, for example, a toner image developed by yellow is transferred onto the paper by the transfer electrifier 17 and other colors are transferred successively by the rotation of the transfer drum 16.

When transfer of four colors is completed by four turns of the transfer drum, the transfer drum 16 is AC-destaticized by the separation electrifier 19 provided on the transfer drum 16, so that the paper is separated by the peel claw 20 and fed to a fixer 30 by a carrying belt 29. The toner image is melted and fixed by hot-press rollers 31. Thus, a copying cycle is completed. In the case where images are to be formed on opposite surfaces of transfer paper, the aforementioned copy cycle is repeated so that an image can be formed on a surface opposite to the surface of transfer paper on which an image has been fixed and formed.

Further, a method in which a toner image on a photosensitive material drum is once primarily transferred onto an intermediate transfer material other than transfer paper and then the toner image is secondarily transferred onto the transfer paper to thereby obtain a copy image, has been described in Unexamined Japanese Patent Publication No. Sho-62-206567. FIG. 2 is a diagram showing a copying machine using such an intermediate transfer material. The reference numeral 100 designates a photosensitive material drum. On the surface of the photosensitive material drum 100, electrophotographic process executing means such as a primary electrifier, an image exposure means, a developer, etc. not shown are provided so that a toner image T is formed. The toner image T formed on the surface of the photosensitive material drum 100 is fed to a primary transfer position with the rotating operation of the photosensitive material drum 100.

The reference numeral 101 designates an endless belt-like intermediate transfer material laid between a plurality of rollers. The intermediate transfer material 101 in the primary transfer position is arranged so as to be in contact with or near the surface of the photosensitive material drum 100.

The reference numeral 102 designates a primary transfer corona discharger disposed on the back side with respect to the primary transfer position of the intermediate transfer material 101. A voltage having polarity reversed to the toner charge polarity on the photosensitive material drum 100 is applied to the corona discharger 102 to thereby perform electric discharge. The reference numeral 103 designates a secondary transfer bias roll for holding transfer paper 104 fed from a paper supply tray 105, between the roll 103 and the intermediate transfer material 101. A transfer voltage having polarity reversed to the toner charge polarity is applied to the secondary transfer bias roll 103. The reference numeral 106 designates a feed roller for feeding the transfer paper 104 placed on the paper supply tray 105 toward the intermediate transfer material 101; 107, a peeling claw having an end freely touching the intermediate transfer material 101 in a peeling position; and 108, a carrying belt for carrying transfer paper peeled by the peeling claw 107 toward a fixing unit not shown.

The transfer paper on which the toner image has been transferred is fed from the carrying belt to a hot-press roller fixing unit not shown. In the hot-press roller fixing unit, the toner image is melted and fixed, so that a copy cycle is completed. In the case where images are to be formed on opposite surfaces of transfer paper, a toner image is secondarily transferred from the intermediate transfer material 101 onto a surface opposite to the surface of transfer paper on which the aforementioned image has been fixed and formed, and then the toner image is melted and fixed by the hot-press roller fixing unit to thereby make it possible to form images on opposite surfaces of transfer paper.

In the aforementioned color image forming method, an attempt to generate images on opposite surfaces of transfer paper has been made. For example, a method in which color duplex transfer paper with the opacity of not lower than 90% and with the brightness of not lower than 85% is used for forming color images on opposite surfaces of the transfer paper, has been proposed in Unexamined Japanese Patent Publication No. Hei-6-186769.

As transfer paper for forming color images in the electrophotographic system, transfer paper formed by coating high-quality paper with a small amount of coating composition in order to attain stability of copy curling, high whitening for improvement of color development and higher image quality -has been proposed in Unexamined Japanese Patent Publication Nos. Hei-4-268567, Hei-4-291351, Hei-4-337736, Hei-4-349468, Hei-5-53363, Hei-5-341553, etc.

Further, as transfer paper having specifications of coating paper to obtain high-gloss images, various proposals for improvement mainly in runnability and toner image fixing characteristic of transfer paper have been made in Unexamined Japanese Patent Publication Nos. Sho-62-198875 to 198877, Hei-1-57276, Hei-3-294600, Hei-5-19522, Hei-5-216322, Hei-6-19178, etc.

It has however become clear that serious image failure occurs particularly under a low-humidity environment when images are formed on opposite surfaces of such transfer paper proposed for forming color images or conventional transfer paper used in monochrome electrophotographic copying machines by using the full-color image forming apparatus as shown in FIGS. 1 and 2.

That is, when duplex images are formed under a low-humidity environment, white or thin spots in a diameter range of from about 1 mm to about 2 mm or bird-claw-like white or thin decolored portions in a range of from about 1 mm to several mm are formed in an image portion generated on the second surface. This phenomenon does not occur in the case where duplex copies are generated by using a conventional monochrome copying machine or in the case where a simplex image is formed by using a full-color image forming apparatus as shown in FIGS. 1 and 2. This phenomenon is peculiar to the case where duplex images are formed under a low-humidity environment by using such a full-color image forming apparatus. This phenomenon has been seen from conventional knowledge.

The inventors of the present invention have examined this phenomenon carefully. As a result, this phenomenon does not occur at the time of fixing the second-surface image but occurs after the second-surface image is transferred. Examining more in detail, this phenomenon is caused by the fact that toner images which have not been fixed on transfer paper are made to scatter by a phenomenon of electric discharge from transfer paper in the second-surface transfer region. There has been required transfer paper free from image failure caused by electric discharge which occurs when full-color duplex images are formed under a low-humidity environment. Besides this requirement, requirements for full-color duplex recording transfer paper are nonshowthrough, suppression of curling, smooth and sharp image quality, high color development, excellent paper feeding characteristic, etc.

As transfer paper for forming full-color duplex images, a proposal in which proportion of fillers to be mixed is improved to attain high opacity to thereby provide non-showthrough has been made in Unexamined Japanese Patent Publication No. Hei-6-186769; and a proposal in which a release agent from fixing rolls is absorbed to transfer paper to thereby prevent image stain on the second surface and a proposal for transfer paper having a release agent absorbing layer therefor have been made in Unexamined Japanese Patent Publication No. Hei-5-127547.

In any case, there is however no proposal for improving image failure caused by electric discharge which occurs when full-color duplex images are formed under a low-humidity environment.

Image failure caused by electric discharge which occurs when full-color duplex images are formed under a low-humidity environment will be explained below with reference to FIG. 1. In full-color copying, multicolor toner (generally, toner of four colors consisting of yellow, magenta, cyan, and black) formed on transfer paper are melted and mixed with each other sufficiently by hot pressure of a fixing unit designated by the reference numeral 30 to thereby obtain sharp color development. Therefore, thermal capacity given to transfer paper by the fixing unit is large compared with the conventional monochrome copying machine using black toner.

Accordingly, the water content of transfer paper in this occasion is small compared with the case where the monochrome copying machine is used. When a copy is to be made onto the back surface, this transfer paper is placed on the paper supply portion 4 again and then development images of respective colors on the photosensitive material drum 11 are electrostatically transferred, by corona discharge for each color by means of the transfer electrifier 17, onto this transfer paper carried by the transfer drum 16. On the transfer paper which has once passed through the fixing unit under a low-humidity environment, electric charges received at the time of transferring toner of respective colors are accumulated so that an electric discharge phenomenon occurs in a portion where the transfer drum 16 and the photosensitive material drum 11 are adjacent to each other.

Further, in the case of a transfer method using an intermediate material as shown in FIG. 2, toner of four colors (yellow, magenta, cyan and black) at maximum must be transferred collectively by applying a transfer voltage having polarity reversed to the toner charge polarity by using the secondary transfer bias roll 103. Accordingly, the transfer voltage in one transferring operation is high compared with the case where the monochrome copying machine is used or the case where toner of respective colors as shown in FIG. 1 is multiplex-transferred onto transfer paper.

Accordingly, also in the transfer method using such an intermediate material as shown in FIG. 2, in the case of specifications in which an image is formed on the back surface of transfer paper once having passed through the fixing unit particularly under a low-humidity environment, a phenomenon of electric discharge from transfer paper occurs in a region near the secondary transfer bias roll 103 holding transfer paper between the bias roll 103 and the intermediate material 101 and supplied with the transfer voltage having polarity reversed to the toner charge polarity. Further, the same image failure caused by the electric discharge phenomenon occurs in a method of multiplex-transferring development images of respective colors from the photosensitive material or intermediate material, or in a method of collectively transferring development images of multicolors from the photosensitive material or intermediate material, as well as the method shown in FIGS. 1 and 2.

SUMMARY OF THE INVENTION

It is an object of the present invention to provide electophotographic transfer paper which is free from image failure caused by electric discharge even when images are recorded on opposite surfaces of transfer paper under a low-humidity environment by using an indirect dry electrophotographic digital full-color copying machine/printer and which has minimal image print-through or show-through to the back surface as particularly required for duplex transfer paper, and free from image roughness even in an ordinary or high humidity environment as well as the low-humidity environment to thereby make it possible to form full-color duplex images with high color development and no image failure.

It is another object of the present invention to provide a method for forming color images by using the aforementioned electrophotographic transfer paper.

Electrophotographic transfer paper of the present invention is comprised of a base paper and a coating layer including a pigment and an adhesive agent which is provided on at least one side of said base paper; wherein volume resistivity (VR) and surface resistivity (SV) after humidity is adjusted to 30% RH for 12 hours satisfy an expression of $\mathrm{Log}(VR/SR) \leqq 1.5$.

According to the present invention, in duplex recording using indirect dry electrophotographic full-color and monochrome copying machines/printers, the occurrence of discharge mark and the occurrence of density irregularity in a high-density image region are suppressed to thereby make it possible to provide electrophotographic transfer paper excellent in fixing characteristic, nonshowthrough, non-image-missing property and non-paper-dust-generation property.

BRIEF DESCRIPTION OF THE DRAWINGS

In the accompanying drawings.

DETAILED DESCRIPTION OF THE INVENTION

The detailed description of the present invention will be described referring to the accompanying drawings as follows. In order to solve the conventional problems, the inventors of the present invention have eagerly examined the occurrence of image failure in duplex full-color images under a low-humidity environment (10° C., 30% RH) and the characteristic/specifications of transfer paper by using the full-color image forming apparatus shown in FIG. 1.

The aforementioned image failure (hereinafter referred to as discharge mark) caused by electric discharge from transfer paper at the time of forming duplex images under the low-humidity environment is an electrostatic phenomenon. This phenomenon was confirmed by using transfer paper while changing the quantity of an electroconductive agent (NaCl) in the surface size of transfer paper and changing the surface resistivity of transfer paper in the case where the humidity was perfectly adjusted to 10° C., 30% RH. In this occasion, the humidity of transfer paper subjected to this experiment was perfectly controlled under the environment of 10° C., 30% RH.

The relation between the surface resistivity of transfer paper and the discharge mark, however, could not be found. Analyzing more in detail, it was found that the discharge mark occurred in paper having the volume resistivity higher than $6\times10^{13}\Omega\cdot cm$ regardless of the surface resistivity when the humidity was perfectly controlled to 10° C., 30% RH.

Figure 3:
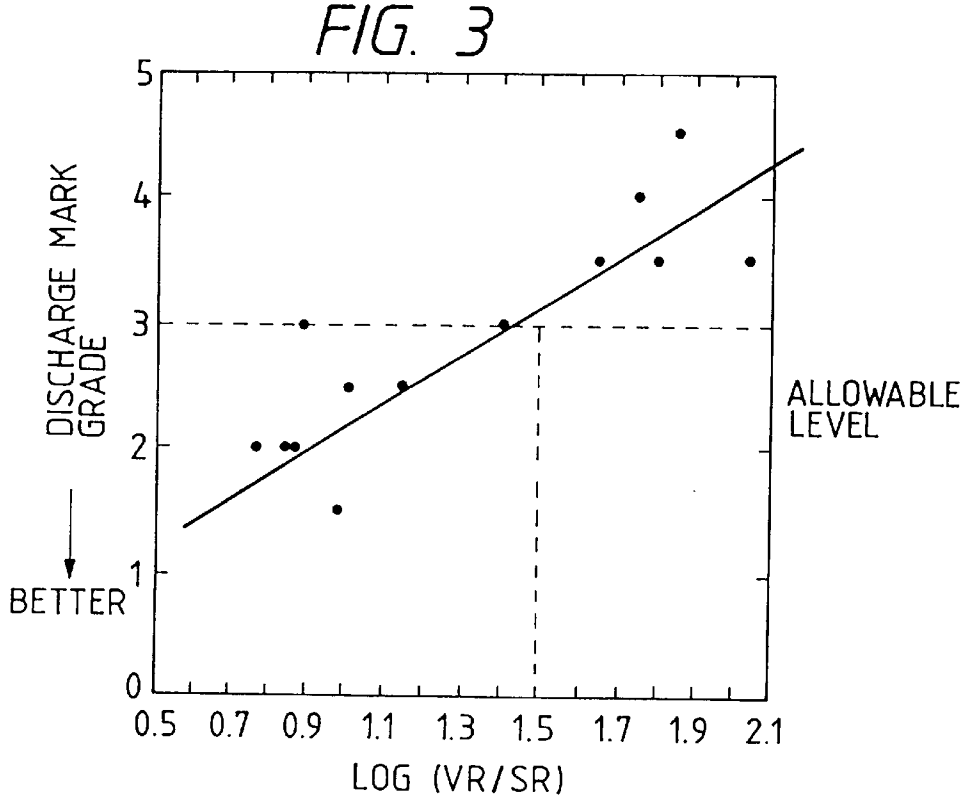
FIG. 3 is a graph showing the relation between log(VR/SR) and discharge mark (grade)

Moreover, it was found that the discharge mark could be prevented in the case of transfer paper having the volume resistivity of not higher than $6\times10^{13}\Omega\cdot cm$ when the humidity was perfectly controlled to 10° C., 30% RH as shown in FIG. 3 so long as the surface resistivity (SR) and the volume resistivity (VR) measured in the same condition satisfied the expression $\mathrm{Log}(VR/SR) \leqq 1.5$. More preferably, it could be confirmed that the discharge mark was eliminated when Log(VR/SR) was not more than 1.0.

Figure 4:
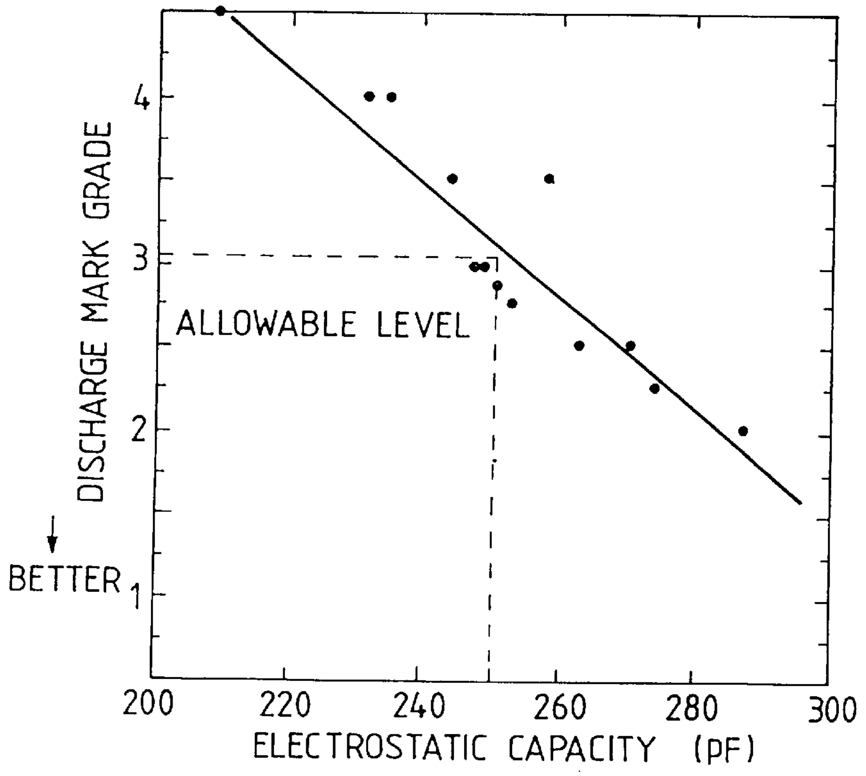
FIG. 4 is a graph showing the relation between electrostatic capacity and discharge mark (grade).

Further, transfer paper having the volume resistivity of not higher than $6\times10^{13}\Omega\cdot cm$ when the humidity was perfectly controlled to 10° C., 30% RH was conformed more in detail in the case where the basis weight was in a range of from 80 to 110 $g/m^2$. As a result, it was found that the discharge mark did not occur regardless of the basis weight so long as the electrostatic capacity of transfer paper perfectly controlled under the environment of 10° C., 30% RH was not lower than 250 pF. Thus, the present invention has been perfected as shown in FIG. 4.

Accordingly, the discharge mark can be prevented so long as the volume resistivity is not higher than $6\times10^{13}\Omega\cdot cm$ and Log(VR/SR) is not more than 1.5 when the humidity is perfectly controlled to 10° C., 30% RH. Further, the discharge mark can be prevented so long as the electrostatic capacity is not lower than 250 pF. Further, a phenomenon of partial deletion occurs undesirably at the time of high humidity when the volume resistivity is lower than $1\times10^{12}\Omega\cdot cm$ when the humidity is perfectly controlled to 10° C., 30% RH. For the same reason, it is preferable that the electrostatic capacity is not higher than 300 pF. Further, it is preferable that Log(VR/SR) is not more than 1.0.

As resistivity measurers used in the present invention, R8340 Ultra High Resistance Meter and R12704 Resistivity Chamber made by Advantest Co., Ltd. were used in combination. As for the measurement method, a 50 mmφ electrode was used and measurement was made in the applied voltage of 100V in accordance with JIS K6911. Incidentally, in the case of measurement of surface resistivity, a 10 μm-thick insulating PET film was put between transfer paper and a counterelectrode. As for the electrostatic capacity measurement method, an SE-70 type solid electrode made by Ando Electric Co., Ltd. was connected to 4262A LCR METER made by Hewlett-Packard Co. and electrostatic capacity was measured at 1 kHz by using a 37 mmφ electrode.

As for images to be evaluated, the discharge mark was evaluated with respect to the output image area percentages 100%, 70%, 50% and 30% of 2×2 cm patches of yellow, magenta, cyan, black, red, blue, green and so-called processed black consisting a mixture of yellow, magenta, cyan and black both on the first surface and on the second surface. Further, the period from the simplex copying output to the start of the duplex copying operation was shortened as much as possible (to within about one minute).

When duplex color images are to be obtained, one of the surfaces has to twice pass through the fixing unit. If toner is melted excessively, image roughness or showthrough occurs easily in this surface. When a pigment having a refractive index higher than the refractive index 1.57 of cellulose fiber is applied onto this surface by an adhesive agent, the opacity can be improved greatly without increase of roughness of duplex full-color images and without increase of the basis weight. Therefore, showthrough can be prevented. In the case of conventional proposed coating paper (for example, Unexamined Japanese Patent Publication Nos. Sho-62-198877, Hei-5-19522, etc.), however, a latex type binder is mainly used, so that not only the volume resistivity is apt to be high under a low-humidity environment but also the viscosity of the coating composition is high. As a result, even if an electroconductive agent is mixed in the coating composition, the electroconductive agent hardly penetrates into the paper layer so that there is a tendency that difference occurs between surface resistivity and volume resistivity. For this reason, the discharge mark occurs conventionally.

The inventors of the present invention have investigated eagerly for improvement of this point. As a result, it was found that the range of volume resistivity, the range of surface resistivity and the range of electrostatic capacity at the time of perfectly adjusting the humidity to the aforementioned value 10° C., 30% RH can be achieved by optimizing the mixture proportion of ionic conductive materials such as inorganic salts and/or high-molecular electroconductive agents and water-soluble polymers such as starch, etc. as adhesive agents and by optimizing the penetration of the electroconductive materials into the basic paper. In this occasion, the amount of water-soluble polymers is preferably not smaller than 50% by weight per the total amount of adhesive agents.

Further, it was found that the volume resistivity at the time of perfectly adjusting the humidity to 10° C., 30% RH is reduced to thereby improve the discharge mark more greatly when the filler in the base material contains 3% by weight or more of electroconductive powder such as tin oxide, etc. per pulp.

As a base material or transfer paper in the present invention, there may be used acidic or neutral high-quality paper, machanical paper, rough paper, recycled paper, etc. As fillers used therein, there may be used: calcium carbonates such as ground lime stone, precipitated calcium carbonate, chalk, etc.; silicates such as kaolin, baked clay, pyrophylite, sericite, talc, etc.; inorganic fillers such as titanium dioxide, etc.; and organic pigments such as urea resin, styrene, etc. To maintain opacity, the preferred are fillers having larger refractive indexes.

Pulp used in the base paper of the electrophotographic transfer paper of the present invention is not limited specifically. For example, chemical pulp such as LBKP (hardwood bleached kraft pulp), NBKP (needle-leaf bleached kraft pulp), LBSP (hardwood bleached sulfite pulp), NBSP (needle-leaf bleached sulfite pulp), etc. may be used. Incidentally, when softwood pulp such as NBKP, NBSP, etc. is used, fiber is long so that a flock is apt to be generated to cause bad formation. From the point of view of increasing stiffness for controlling curling after copying, it is preferable that 80% by weight or more of LBKP is mixed in the total pulp.

Further, non-wood pulp such as linter pulp, etc., and high-yield pulp such as waste paper pulp, GP (pround wood pulp), TMP (thermo-mechanical pulp), etc. may be used mixedly or singly taking into account the degree of deterioration of formation and taking into account color reproducibility so that brightness is not so low after coating.

In order to heighten the brightness after coating, the aforementioned pulp may be selectively used in the base paper, pulp obtained by enforcing the pulp bleaching process may be used or a fluorescent dye may be mixed in pulp slurry in use.

From the point of view of maintaining image quality and improvement of opacity and brightness in the electrophotographic system, it is preferable that calcium carbonate is mixed. The most preferred is metal oxide such as tin oxide because metal oxide is electronically conductive. Such metal oxide may be mixed with other fillers or may be used singly. The electroconductive filler is preferably used in an amount of 3% by weight or more so that the total amount of fillers is in a range of from 10 to 25% by weight. If the total amount of fillers is larger than 25% by weight, the strength of paper is weakened so that paper dust is apt to be generated. If the total amount of fillers is smaller than 10% by weight, opacity is apt to become poor.

The sizing agent is not limited specifically. For example, there may be used sizing agents such as rosin sizing agents, synthetic sizing agents, petroleum resin sizing agents, neutral sizing agents, etc. Suitable fixing agents for sizing agents such as alum, cationic starch, etc. and fiber may be used in combination preferably. Other materials such as paper force enhancing agents, dyes, pH adjusters, etc. may be added. Further, as a base material, there may be used polyethylene terephthalate film, polysulfone film, polyphenylene oxide film, polyimide film, polycarbonate film, cellulose ester film, etc. having a heat-resisting temperature of not lower than 100° C.

To adjust electric resistivity, inorganic compounds such as sodium chloride, potassium chloride, calcium chloride, sodium sulfate, zinc oxide, titanium dioxide, tin oxide, aluminium oxide, magnesium oxide, etc. and organic compounds such as alkyl phosphate, alkyl sulfate, sodium sulfonate, quaternary ammonium salt, etc. may be used singly or mixedly in the base materials.

As pigments used in the coating layer in the case of coating paper, various links of pigments ordinarily used in general coating paper may be used singly or in combination. Examples of the pigments include: mineral pigments such as ground lime stone, precipitated calcium carbonate, titanium dioxide, aluminium hydroxide, satin white, talc, calcium sulfate, barium sulfate, zinc oxide, magnesium oxide, magnesium carbonate, amorphous silica, colloidal silica, white carbon, kaolin, calcined kaolin, delaminate kaolin, aluminosilicate, sericite, bentonite; organic pigments such as polystyrene resin fine particles, urea formaldehyde resin fine particles, microballoon particles, etc.; and so on. The amount of pigments is set to be no larger than 70% by weight, preferably in a range of from 30 to 60% by weight, in the total amount of the coating composition.

Pigments having a refractive index of not lower than 1.60 may be selected from not only inorganic pigments such as titanium dioxide, aragonite type calcium carbonate, zinc oxide, calcined clay, magnesium oxide, etc. but also organic pigments.

As adhesive agents used in the coating layer, hydrophilic adhesive agents, emulsion, latex, etc. having strong adhesive force with respect to the base material and additives such as pigments, etc., may be used singly or mixedly. For example, there may be used hydrophilic resins such as polyvinyl alcohol, denatured polyvinyl alcohol, starches, gelatin, casein, methyl cellulose, hydroxyethyl cellulose, acrylic amide-acrylic ester copolymer, acrylic amide-acrylic acid-methacrylic acid terpolymer, styrene-acryl resin, isobutylene-maleic anhydride resin, carboxymethyl cellulose, etc., acrylic emulsion, vinyl acetate emulsion, vinylidene chloride emulsion, polyester emulsion, styrene-butadiene latex, acrylonitrile-butadiene latex, and so on. Preferably, the amount of the water-soluble polymers mixed in the total amount of the adhesive agents is not smaller than 50% by weight. Preferably, the amount of the adhesive agents mixed in the total amount of the coating composition is in a range of from 40 to 70% by weight.

As other additives, dyes or colored pigments may be added to the coating composition to adjust color tone or fluorescent dyes may be added to the coating composition to improve visual brightness.

Further, as an agent for adjusting the surface (volume) resistivity, a known material used in the base material may be used to adjust the surface (volume) resistivity to a target value.

Further, various kinds of assisting agents such as dispersing agents, antifoam agents, plasticizers, pH adjusting agents, lubricants, fluidity denaturing agents, solidification promoting agents, water resisting agents, sizing agents, etc. may be added as occasion demands.

As a coating method, for example, any off-machine coater for blade coating, air-knife coating, roll coating, bar coating, reverse roll coating, gravure coating, curtain coating, etc. or any on-machine coater in which a coating machine is provided for gate roll coating, size-press coating, etc. may be used. The quantity of coating in the coating layer is preferably in a range of from 2 to 12 g/m$^2$. If the quantity of coating is smaller than 2 g/m$^2$, fibers on the surface of paper cannot be coated with the coating layer so that roughness of fibers remains to disorder the resulting image. If the quantity of coating is larger than 12 g/m$^2$, the image quality improving effect is saturated so that the quantity of paper dust increases undesirably as well as increase in cost.

A transfer paper smoothing process can be carried out by machine calendering, super calendering, etc. so that the Oken's smoothness (according to a method described in JAPAN TAPPI No. 5, hereinafter referred to as smoothness, simply) of the transfer layer after coating and drying is set to be in a range of from 40 to 300 sec. Preferably, the smoothness is set to be in a range from of 60 to 150 sec. In the case of a low-smooth surface having lower smoothness than 40 sec., good transferring cannot be made. In the case of a high-smooth surface having higher smoothness than 300 sec., crushing of transfer paper occurs so that opacity is lowered undesirably. The opacity of paper is preferably not lower than 90% to eliminate the influence of the back-surface copying image or the lower sheet in the case where sheets of paper are piled up.

It is preferable that the basis weight of transfer paper of the present invention is in a range of from 80 to 110 g/m$^2$. If the basis weight is larger than 110 g/m$^2$, the thermal conductivity deteriorates at the time of fixing to make it impossible to surely and uniformly melt the toner so that not only melting irregularity occurs to cause gloss irregularity, density irregularity and fixing failure in the high image density portion but also the stiffness of paper is overheightened to cause particularly second-surface running failure. If the basis weight is smaller than 80 g/m$^2$, the opacity of 90% can hardly be obtained. As a result, not only may toner be overmelted on the twice fixed surface, causing slight toner penetration irregularity, thereby deteriorating the grain-like property (image smoothness) of paper, but also curling is apt to occur so that the second-surface running failure occurs easily.

The brightness of transfer paper of the present invention is not limited specifically. Upon the assumption that the transfer paper is used in a full-color copying machine/printer, brightness by Hunter is preferably not lower than 80%, more preferably not lower than 82%. If the brightness by Hunter is lower than 80%, both saturation and lightness are lowered at the time of color recording to thereby make it difficult to reproduce the record sharply. Further, the opacity is preferably set to be not lower than 90% taking into account showthrough at the time of duplex copying in the full-color copying machine/printer.

Further, the water content of the resulting product after disclosure is adjusted to be in an optimum water content range of from 4.0 to 6.5% in order to suppress surface waviness and curling after copying. Further, the product is packed in moistureproof package such as polyethylene laminate paper, etc. or polypropylene, or the like, so that humidification/dehumidification does not occur at the time of safekeeping.

EXAMPLES

The present invention will be described below more specifically on the basis of examples thereof, while the present invention is not limited thereto.

(Testing Method)

Figure 1:
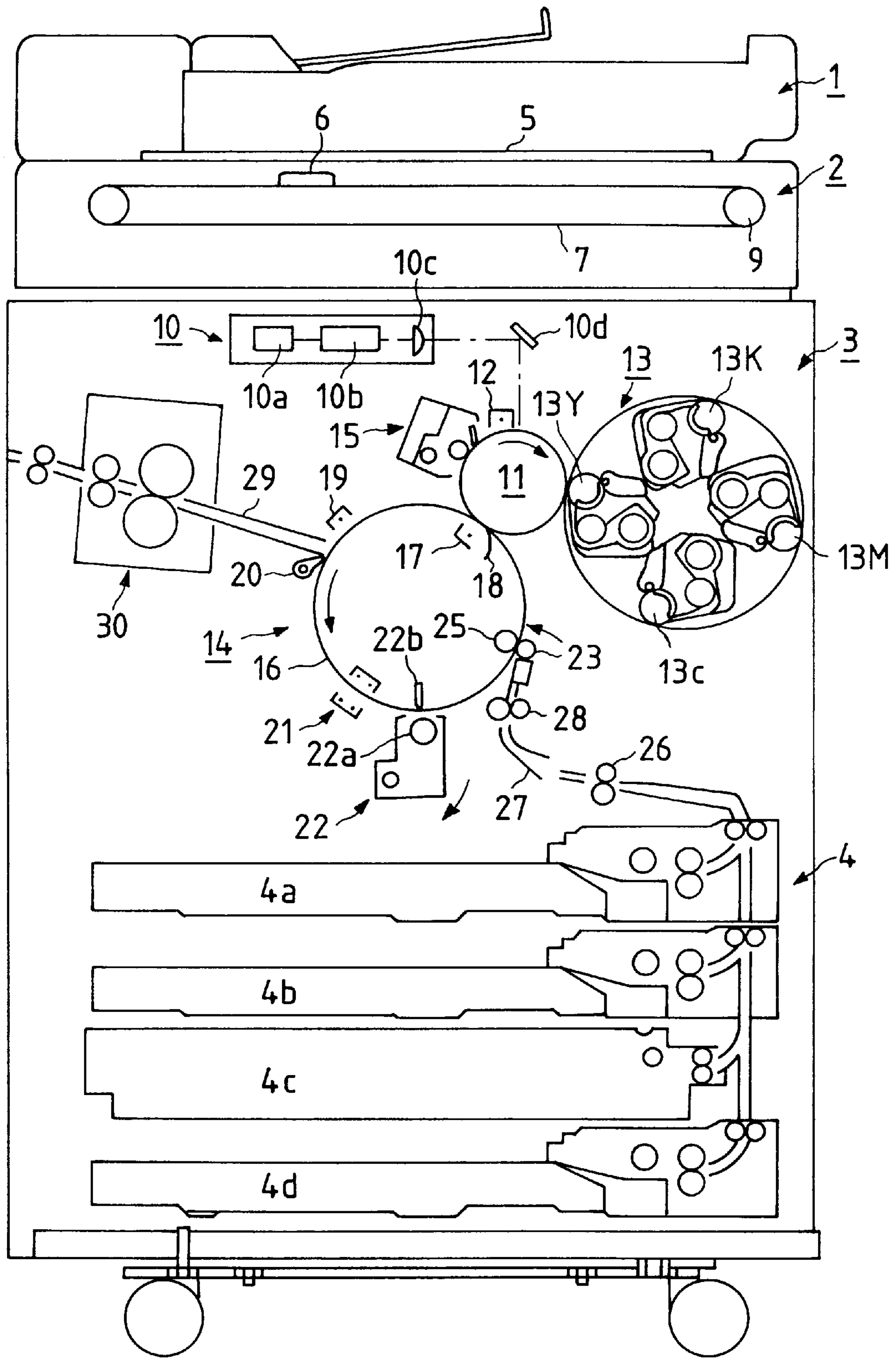
FIG. 1 is a structural diagram of a color image forming apparatus.
Figure 2:
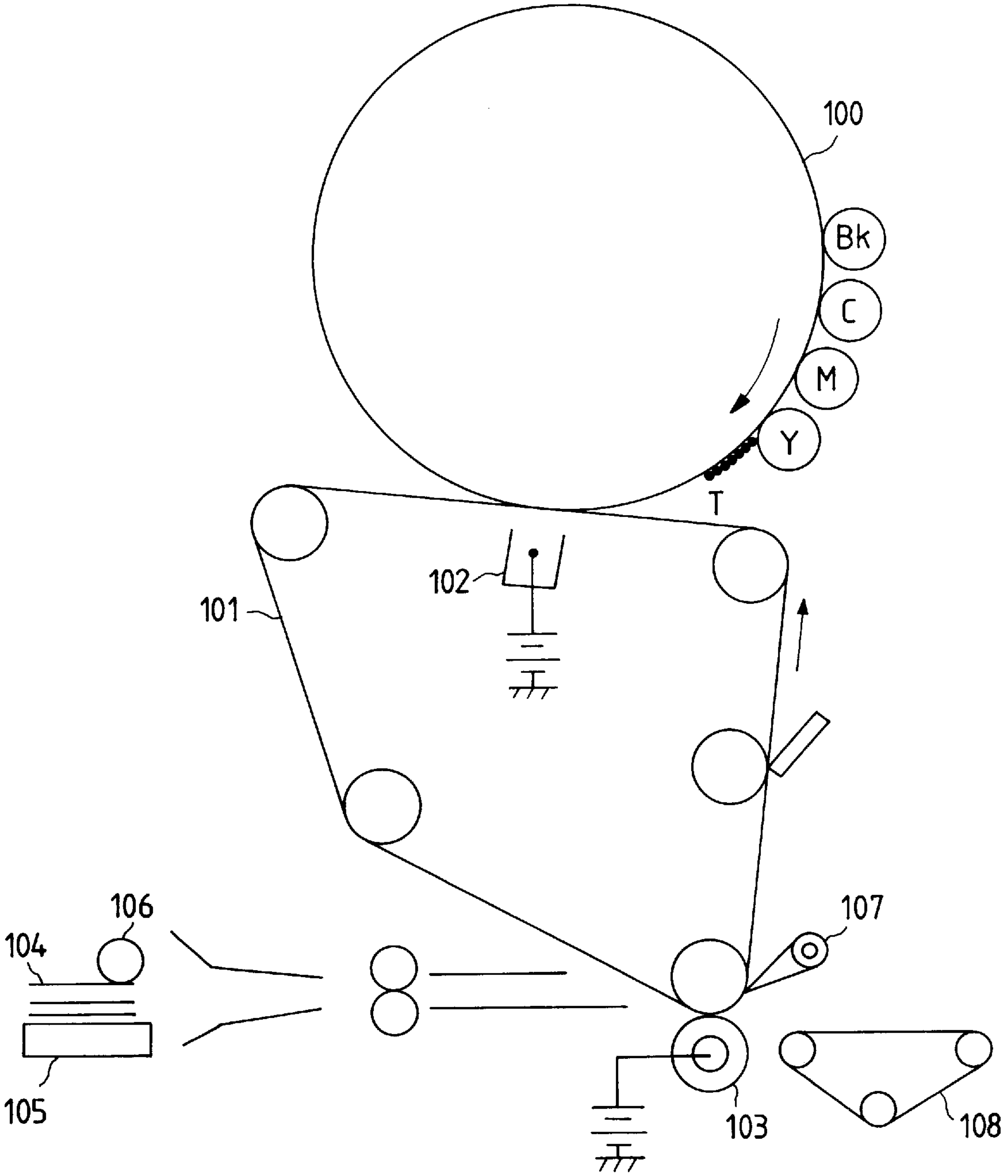
FIG. 2 is a conceptual diagram of a copying machine using an intermediate transfer material.

As for a method of evaluating transfer paper shown in Examples and Comparative Examples, 2 cm×2 cm patches of image area percentages 10, 20, 30, 40, 50, 60, 70, 80, 90 and 100% of yellow, magenta, cyan, red, green, blue and black consisting of a mixture of yellow, magenta and cyan were transferred onto opposite surfaces of transfer paper and fixed by using a color image forming method shown in FIG. 1 as a representative and a dry indirect electrophotographic digital color copying machine A color 635 made by Fuji Xerox Co., Ltd. to thereby evaluate discharge mark, fixing failure, partial deletion, density irregularity and showthrough.

As for an evaluation method of discharge mark and fixing failure, after transfer paper was left for 24 hours or more under an environment of 10° C. and 30% RH, images were formed under the environment of 10° C. and 30% RH by the aforementioned method so that discharge mark was evaluated by eye observation of the second-surface patches and so that fixing failure was judged by partial deletion when the second-surface image patches were bent and then restored.

As for an evaluation method of partial deletion, after transfer paper was left for 24 hours or more under an environment of 28° C. and 85% RH, images were formed under the environment of 28° C. and 85% RH by the aforementioned method so that partial deletion in the respective patches was evaluated by eye observation.

As for an evaluation method of density irregularity and showthrough, after transfer paper was left for 24 hours or more under an environment of 22° C. and 55% RH, images were formed under the environment of 22° C. and 55% RH by the aforementioned method so that density irregularity was evaluated by eye observation of the second-surface image patches and so that showthrough was evaluated by eye observation of the first-surface image patches from the back surfaces in the case where the transfer paper was placed on a white plate.

As for paper dust, after a paper dust receiver capable of collecting paper dust scraped by a cleaning blade was set by remodeling a photosensitive material drum cleaner of FX5990 made by Fuji Xerox Co., Ltd. a development unit was removed, 500 sheets of A4-size transfer paper were subjected to running test under an ordinary machine condition so that the quantity of power dust deposited on the photosensitive material was measured.

As for criterion for evaluation of discharge mark, A shows the fact that no discharge mark occurred (allowable level), B shows the fact that discharge mark occurred a little but there is no problem in practical use (allowable level), and C shows the fact that discharge mark occurred and there is a problem in practical use (unallowable level).

As for criterion for evaluation of other items, A shows the fact that there is no problem (allowable level), B shows the fact that there is no problem in practical use (allowable level), C shows the fact that there is a problem (unallowable level), and D shows the fact that there is a serious problem (unallowable level).

As for criterion for evaluation of paper dust, the transfer paper was compared with paper L made by Fuji Xerox Co., Ltd. and classified into A: the case where the quantity of paper dust is smaller than that of paper L, B: the case where the quantity of paper dust was as large as that of paper L, C: the case where the quantity of paper dust was larger than that of paper L, and D: the case where the quantity of paper dust was significantly larger than that of paper L. Also with respect to paper dust, A and B show allowable level.

EXAMPLE 1

As a raw material, pulp obtained by beating multistageously oxygen-bleached and highly whitened LBKP up to a freeness of 470 mlC.S.F. was used Precipitated calcium carbonate (TP121 made by Okutama-Kogyo Co., Ltd.) was added to 100 part by weight of the pulp to obtain 18 part by weight of precipitated calcium carbonate. As adduction sizing agents, 0.08 part by weight of alkenyl succinic anhydride (Fibran 81: National Starch & Chemical Co., Ltd.) per pulp and 0.5 part by weight of cationic starch (Cato Size: National Starch & Chemical Co., Ltd.) per pulp were mixed thereto.

A small amount of fluorescent dye was mixed into this paper material so that brightness by Hunter was 85%. In the basis weight of 87 g/m$^2$, paper was made by a fourdriner multicylinder paper machine. A dryer condition was adjusted so that the water content after paper-making was 5% by weight. Further, 0.9 g/m$^2$ of oxidized starch and 0.1 g/m$^2$ of NaCl were applied in a size press process.

Further, a press process and a machine calender were strengthened to make smoothness and density high. Thus, base paper having an apparent density of 0.82 g/cm$^3$ was obtained.

Then, 0.5 part by weight of sodium pyrophosphate was added to 100 part by weight of water, and 95 part (solid content; this will be applied to the following description) by weight of calcium carbonate (made by Maruo Calcium Co., Ltd.) and 5 part by weight of titanium dioxide (JA-1, refractive index 2.25, made by Tayca) were mixed thereto. Then, water was dispersed by cowless dissolver, so that pigment slurry was obtained. To this pigment slurry, 70 part by weight of starch (Oji Ace A: made by Oji Corn Starch Co. Ltd.) and 30 part by weight of polyvinyl alcohol (PVA) (Poval 117 made by Kuraray Co., Ltd.) were added. The mixture was mixed with water and stirred, so that a first coating composition with a concentration of 15% by weight was prepared.

This first coating composition was applied as solid content onto the base paper by a Meyer bar coater so that the quantities of coating after drying were 6 g/m$^2$ on the F (felt) surface of the base paper and 6 g/m$^2$ on the W (wire) surface of the base paper and that the total basis weight was 100 g/m$^2$. Then, a super calendering process was carried out so that the Oken's smoothness of the coating surface of the F surface was 100 sec., and adjustment was made so that the water content of the resulting product after disclosure was 4%. Thus, electrophotographic transfer paper of Example 1 having characteristic shown in Table 1 was obtained.

It was apparent from Table 1 that electrophotographic transfer paper having no discharge mark, no fixing failure, no partial deletion and no density irregularity, being excellent in non-showthrough and being small in the quantity of paper dust could be obtained as the transfer paper of Example 1.

EXAMPLES 2 AND 3

Two kinds of transfer paper of Examples 2 and 3 having the total basis weight of 82 g/m$^2$ and the total basis weight of 107 g/m$^2$ respectively were obtained by performing paper-making and coating under the same paper material condition and the same paper-making condition as in Example 1, except that the basis weight of base paper was changed to 69 g/m$^2$ and 94 g/m$^2$ respectively.

Electrophotographic transfer paper having no discharge mark, no fixing failure, no partial deletion and no density irregularity, being excellent in non-showthrough and being small in the quantity of paper dust could be obtained as the transfer paper of Example 2.

Electrophotographic transfer paper having no partial deletion and no density irregularity, being excellent in non-showthrough, being small in the quantity of paper dust and being in an allowable discharge mark range and in a practically satisfiable fixing failure range could be obtained as the transfer paper of Example 3.

EXAMPLES 4 AND 5

A second coating composition was prepared by adding 2 part by weight of NaCl to 100 part by weight of the solid content of the first coating composition in Example 1. When paper-making was performed under the same paper material condition and the same paper-making condition as in Example 1, the second coating composition was applied to opposite surfaces of the base paper in a size press process so that a coating of 2 $g/m^2$ per one surface was formed. Thus, transfer paper of Example 4 was obtained.

On the other hand, duplex coating was performed on base paper of the basis weight of 86 $g/m^2$ made under the same paper material condition and the same paper-making condition as in Example 1 so that the quantity of coating per one surface was 12 $g/m^2$. Thus, transfer paper of Example 5 was obtained.

Electrophotographic transfer paper being excellent in non-fixing-failure property, non-image-missing property, and non-showthrough, being small in the quantity of paper dust, and being in an allowable discharge mark range and in a practically satisfiable density irregularity range could be obtained as the transfer paper of Example 4.

Electrophotographic transfer paper being excellent in non-image-missing property, non-density-irregularity property, and non-showthrough, being small in the quantity of paper dust and being in an allowable discharge mark range and in a practically satisfiable fixing failure range could be obtained as the transfer paper of Example 5.

EXAMPLE 6

The same coating composition as the first coating composition was applied onto opposite surfaces of base paper in the coating amount of 6 $g/m^2$ per one surface by using the same paper material as in Example 1, except that the quantity of adduction material in the base paper was changed to 12 part by weight and that the mixture proportion of calcium carbonate and titanium dioxide of 95:5 was changed to 98:2. Thus, transfer paper of Example 6 was obtained.

Electrophotographic transfer paper being excellent in non-discharge-mark property, non-fixing-failure property, non-image-missing property and non-density-irregularity property, being small in the quantity of paper dust, and being in a practically satisfiable non-showthrough range could be obtained as the transfer paper of Example 6.

EXAMPLES 7 TO 9

The coating composition 1 was applied onto base paper made under the same paper-making condition as in Example 1 and obtained by changing the quantity of NaCl of 0.1 $g/m^2$ in the size press process to 0.05 $g/m^2$. Thus, transfer paper of Example 7 was obtained.

On the other hand, 20 part by weight of adduction materials was reduced to 12 part by weight, 3 part by wight of electroconductive titanium dioxide (made by Mitsui Kinzoku Kogyo Co., Ltd.) was mixed to the 12 part by weight of adduction materials and then base paper obtained by changing the quantity of NaCl from 0.1 $g/m^2$ to 0.12 $g/m^2$ was subjected to coating in the size press process in the same manner as in Example 1 thus to obtain transfer paper of Example 8.

Further, a coating composition obtained by adding 1 part by weight of NaCl to 100 part by weight of the total solid content of the coating composition of Example 1 was applied to base paper made in the same condition as in Example 1, except that 18 part by weight of adduction materials was changed to 22 part by weight and that titanium dioxide was removed from the coating composition 1. Thus, transfer paper of Example 9 was obtained.

Electrophotographic transfer paper being excellent in non-fixing-failure property, non-image-missing property, non-density-irregularity property, and non-showthrough, being small in the quantity of paper dust and being in an allowable discharge mark range could be obtained as the transfer paper of Example 7.

Electrophotographic transfer paper being excellent in non-discharge-mark property, non-fixing-failure property, non-density-irregularity property, and non-showthrough, having no paper dust, and being in a practically satisfiable partial deletion range could be obtained as the transfer paper of Example 8.

Electrophotographic transfer paper being excellent in non-fixing-failure property, non-image-missing property, non-density-irregularity property and non-showthrough, and being in an allowable paper dust range and in an allowable discharge mark range could be obtained as the transfer paper of Example 9.

TABLE 1

| | EXAMPLE NO. | | | | | | | | |
|---|---|---|---|---|---|---|---|---|---|
| | 1 | 2 | 3 | 4 | 5 | 6 | 7 | 8 | 9 |
| BASIS WEIGHT ($g/m^2$) | 87 | 69 | 94 | 87 | 85 | 87 | 87 | 87 | 87 |
| FILLERS (%) | 18 | 18 | 18 | 18 | 18 | 12 | 18 | 12 | 22 |
| ELECTROCONDUCTIVE FILLER IN FILLERS (%) | 0 | 0 | 0 | 0 | 0 | 0 | 0 | 3 | 0 |
| TOTAL BASIS WEIGHT ($g/m^2$) | 100 | 80 | 107 | 90 | 110 | 100 | 100 | 100 | 100 |
| COATING AMOUNT ON FS/WS FACE ($g/m^2$) | 6/6 | 6/6 | 6/6 | 2/2 | 12/12 | 6/6 | 6/6 | 6/6 | 6/6 |
| HIGH-REFRACTIVE INDEX IN PIGMENTS (%) | 5 | 5 | 5 | 5 | 5 | 3 | 5 | 5 | 0 |
| OPAQUENESS (%) | 94.4 | 91.5 | 94.3 | 93.7 | 94.2 | 90.4 | 93.2 | 90.8 | 91.8 |
| SURFACE RESISTIVITY (SR) (Ω) [10° C., 30%] | $5.2 \times 10^{11}$ | $5.2 \times 10^{11}$ | $5.2 \times 10^{11}$ | $2.8 \times 10^{11}$ | $5.4 \times 10^{11}$ | $5.4 \times 10^{11}$ | $7.6 \times 10^{12}$ | $2.9 \times 10^{11}$ | $1.2 \times 10^{12}$ |
| VOLUME RESISITIVITY [VR] (Ω) [10° C., 30%] | $4.2 \times 10^{12}$ | $3.6 \times 10^{12}$ | $6.8 \times 10^{12}$ | $3.0 \times 10^{12}$ | $6.6 \times 10^{12}$ | $6.4 \times 10^{12}$ | $4.6 \times 10^{12}$ | $1.9 \times 10^{12}$ | $3.0 \times 10^{12}$ |
| ELECTROSTATIC CAPACITY [pF] [10° C., 30%] | 270 | 272 | 264 | 270 | 266 | 266 | 252 | 298 | 255 |
| Log (VR/SR) | 0.89 | 0.86 | 1.12 | 1.03 | 1.09 | 1.07 | 0.78 | 0.82 | 1.40 |
| DISCHARGE MARK [10° C., 30%] | A | A | A–B | A–B | A–B | A | B | A | B |
| FIXING FAILURE [10° C., 30%] | A | A | B | A | B | A | A | A | A |
| IMAGE MISSING [10° C., 30%] | A | A | A | A | A | A | A | B | A |

TABLE 1-continued

| | EXAMPLE NO. | | | | | | | | |
|---|---|---|---|---|---|---|---|---|---|
| | 1 | 2 | 3 | 4 | 5 | 6 | 7 | 8 | 9 |
| DENSITY IRREGULARITY | A | A | A | B | A | A | A | A | A |
| TRANSPARENCY TO BACK | A | A | A | A | A | B | A | B | A |
| PAPER DUST | A | A | A | A | A | A | A | A | B |

COMPARATIVE EXAMPLES 1 AND 2

Using the same paper material as in Example 1, paper-making and coating were carried out in the same paper-making condition as in Example 1, except that the basis weight of base paper was changed to 65 g/m$^2$ and 99 g/m$^2$ respectively. Thus, two kinds of transfer paper of Comparative Examples 1 and 2 having characteristics shown in Table 2 were obtained (characteristics of the following Comparative Examples were also shown in Table 2). The transfer paper of Comparative Example 1 was low in opacity and unsuitable for practical use because of non-showthrough.

The transfer paper of Comparative Example 2 was high in the basis weight, so that thermal conductivity became poor. As a result, fixing failure and density irregularity occur, so that the transfer paper was unsuitable for practical use.

COMPARATIVE EXAMPLES 3 AND 4

The same coating composition as in Example 1 was applied to opposite surfaces of the same base paper as in Example 1 so that the amount of coating was 1 g/m$^2$ on each surface. Thus, transfer paper of Comparative Example 3 was obtained. On the other hand, the same coating composition as in Example 1 was applied to opposite surfaces of base paper having the basis weight of 81 g/m$^2$ so that the amount of coating was 14 g/m$^2$ on each surface. Thus, transfer paper of Comparative Example 4 was obtained.

The transfer paper of Comparative Example 3 was small in the quantity of coating, so that density irregularity occurred. As a result, the transfer paper was unsuitable for practical use.

In the transfer paper of Comparative Example 4, fixing failure occurred and the quantity of paper dust was large. As a result, the transfer paper was unsuitable for practical use.

COMPARATIVE EXAMPLES 5 TO 7

A coating composition obtained by adding 2 part by weight of NaCl to 100 part by weight of the total solid content of the coating composition of Example 1 was applied, by 6 g/m$^2$ for each surface, to opposite surfaces of the same base paper as in Example 7, except that 18 part by weight of adduction materials in Example 7 was changed to 28 part by weight. Thus, transfer paper of Comparative Example 5 was obtained.

The same coating composition as in Example 1 was applied to base paper which was made in the same paper-making condition as in Example 1 and in which the quantity of NaCl was changed from 0.1 g/m$^2$ to 0.03 g/m$^2$ in the size press process. Thus, transfer paper of Comparative Example 6 having characteristic shown in Table 2 was obtained.

The same coating composition as in Example 1 was applied to base paper in which the quantity of NaCl in Comparative Example 6 was changed to 0.14 g/m$^2$. Thus, transfer paper of Comparative Example 7 having characteristic shown in Table 2 was obtained.

The transfer paper of Comparative Example 5 did not satisfy the condition $\mathrm{Log}(VR/SR) \leqq 1.5$ and the electrostatic capacity thereof was not higher than 250 pF. Accordingly, the discharge mark occurred and the level thereof was an unallowable level. Furthermore, the quantity of paper dust was large. As a result, the transfer paper was unsuitable for practical use.

In the transfer paper of Comparative Example 6, the volume resistivity was high and the electrostatic capacity was low. Accordingly, the discharge mark occurred considerably, so that the transfer paper was unsuitable for practical use.

In the transfer paper of Comparative Example 7, the volume resistivity is low, so that partial deletion occurred at the time of high humidity. Accordingly, the transfer paper was unsuitable for practical use.

COMPARATIVE EXAMPLE 8

Base paper was produced in the same paper-making condition as in Example 1, except that the quantity of adduction materials in Example 1 was reduced from 20 part by weight to 12 part by weight and that 1 part by weight of titanium dioxide used in Example 4 was mixed in the 12 part by weight of adduction materials. A coating composition was prepared by mixing while stirring the same binder as used in Example 1 in the same proportion as in Example 1, except that the pigment was changed to 100 part by weight of calcium carbonate. The coating composition was applied onto the base paper thus to obtain transfer paper of Comparative Example 8 having characteristic shown in Table 2.

The transfer paper of Comparative Example 8 was low in opacity and unsuitable for practical use because of non-showthrough.

TABLE 2

| | COMPARATIVE EXAMPLE NO. | | | | | | | |
|---|---|---|---|---|---|---|---|---|
| | 1 | 2 | 3 | 4 | 5 | 6 | 7 | 8 |
| BASIS WEIGHT (g/m$^2$) | 65 | 99 | 87 | 81 | 87 | 87 | 87 | 87 |
| FILLERS (%) | 18 | 18 | 18 | 18 | 28 | 18 | 18 | 12 |
| ELECTROCONDUCTIVE FILLER IN FILLERS (%) | 0 | 0 | 0 | 0 | 0 | 0 | 0 | 1 |

TABLE 2-continued

| | COMPARATIVE EXAMPLE NO. | | | | | | | |
|---|---|---|---|---|---|---|---|---|
| | 1 | 2 | 3 | 4 | 5 | 6 | 7 | 8 |
| TOTAL BASIS WEIGHT (g/m$^2$) | 78 | 112 | 90 | 110 | 100 | 100 | 100 | 100 |
| COATING AMOUNT ON FS/WS FACE (g/m$^2$) | 6/6 | 6/6 | 1/1 | 14/14 | 6/6 | 6/6 | 6/6 | 6/6 |
| HIGH-REFRACTIVE INDEX IN PIGMENTS (%) | 5 | 5 | 5 | 5 | 5 | 5 | 5 | 0 |
| OPAQUENESS (%) | 89.0 | 94.6 | 92.7 | 94.7 | 93.5 | 93.7 | 93.6 | 89.7 |
| SURFACE RESISTIVITY (SR) (Ω) [10° C., 30%] | $5.0 \times 10^{11}$ | $5.2 \times 10^{11}$ | $4.8 \times 10^{11}$ | $5.2 \times 10^{11}$ | $4.8 \times 10^{11}$ | $6.0 \times 10^{11}$ | $1.1 \times 10^{12}$ | $5.4 \times 10^{11}$ |
| VOLUME RESISITIVITY [VR] (Ω) [10° C., 30%] | $3.2 \times 10^{12}$ | $7.0 \times 10^{12}$ | $4.0 \times 10^{12}$ | $5.2 \times 10^{12}$ | $1.7 \times 10^{12}$ | $7.9 \times 10^{12}$ | $8.8 \times 10^{11}$ | $6.4 \times 10^{12}$ |
| ELECTROSTATIC CAPACITY [pF] [10° C., 30%] | 280 | 260 | 272 | 270 | 247 | 238 | 306 | 280 |
| Log (VR/SR) | 0.81 | 1.13 | 0.92 | 1.00 | 1.55 | 1.12 | 0.90 | 1.07 |
| DISCHARGE MARK [10° C., 30%] | A | A–B | A | A–B | C | B–C | A | A |
| FIXING FAILURE [10° C., 30%] | A | C | A | C | B | A | A | A |
| IMAGE MISSING [10° C., 30%] | A | A | A | A | A | A | C | A |
| DENSITY IRREGULARITY | A | A | C | A | A | A | A | A |
| TRANSPARENCY TO BACK | C | A | A | A | A | A | A | C |
| PAPER DUST | A | A | A | C | C | A | A | A |

What is claimed is:

1. Electrophotographic transfer paper comprising a base paper and a coating layer, wherein the coating layer comprises a pigment and an adhesive agent;

the coating layer is on at least one side of the base paper;

volume resistivity (VR) and surface resistivity (SR), of the electrophotographic transfer paper after humidity is adjusted to 10° C., 30% RH for 12 hours to satisfy an expression of $\mathrm{Log}(VR/SR) \leqq 1.5$;

the volume resistivity (VR), of the electrophotographic transfer paper after the humidity is adjusted to 10° C., 30% RH for 12 hours, is in a range of $1\times10^{12}$ to $6\times10^{13}$ Ω·cm;

opacity of the electrophotographic transfer paper is not lower than 90%;

basis weight is in a range of 80 g/m$^2$ to 110 g/m$^2$; and said coating layer is in a range of 2 g/m$^2$ to 12 g/m$^2$ as solid content, and said adhesive agent includes 50% or more of water-soluble polymers of the total amount of the adhesive.

2. Electrophotographic transfer paper according to claim 1, wherein said pigment includes a pigment having a refractive index of not smaller than 1.60.

3. Electrophotographic transfer paper according to claim 1, wherein electrostatic capacity after humidity is adjusted to 10° C., 30% RH for 12 hours is not lower than 250 pF.

* * * * *